(12) United States Patent
Lin et al.

(10) Patent No.: US 8,645,833 B2
(45) Date of Patent: Feb. 4, 2014

(54) ASYNCHRONOUSLY GENERATED MENUS

(75) Inventors: Chi-Hwei Lin, Somerville, MA (US);
Prakash Sridharan, Chennai (IN);
Manoj J. Mohan, Chennai (IN); Sankar Rajaraman, Chennai (IN);
Nandakumar Kalyanasundaram, Perambalur (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1883 days.

(21) Appl. No.: 11/618,097

(22) Filed: Dec. 29, 2006

(65) Prior Publication Data
US 2008/0163260 A1    Jul. 3, 2008

(51) Int. Cl.
*G06F 17/00*    (2006.01)
*G06F 3/00*    (2006.01)

(52) U.S. Cl.
USPC ............ 715/719; 715/205; 715/234; 715/741

(58) Field of Classification Search
USPC .................. 715/719, 205, 234, 741
See application file for complete search history.

(56) References Cited

U.S. PATENT DOCUMENTS

| | | | | |
|---|---|---|---|---|
| 7,487,201 | B1 * | 2/2009 | Murray et al. ................ | 709/201 |
| 2004/0021684 | A1 * | 2/2004 | B. Millner .................... | 345/719 |
| 2005/0273762 | A1 * | 12/2005 | Lesh ............................ | 717/115 |
| 2006/0047780 | A1 * | 3/2006 | Patnude ....................... | 709/219 |
| 2007/0067219 | A1 * | 3/2007 | Altberg et al. ................ | 705/14 |
| 2007/0112800 | A1 * | 5/2007 | Seidl et al. ................... | 707/100 |
| 2007/0113201 | A1 * | 5/2007 | Bales et al. .................. | 715/810 |
| 2007/0226314 | A1 * | 9/2007 | Eick et al. ................... | 709/217 |
| 2007/0288890 | A1 * | 12/2007 | Wells .......................... | 717/113 |
| 2008/0040653 | A1 * | 2/2008 | Levine ........................ | 715/205 |
| 2008/0065514 | A1 * | 3/2008 | Eaton ........................... | 705/27 |

OTHER PUBLICATIONS

Co-pending application, by Tse-Hsin Liu et al., entitled "Generation of Menus for Multiple Back-End Systems", filed Dec. 29, 2006, 28 pages.

* cited by examiner

*Primary Examiner* — Boris Pesin
*Assistant Examiner* — Matthew Ell

(57) ABSTRACT

Techniques described herein may provide web pages to customers describing various accounts of the customers. In one implementation, a system receives a request for a web page from a client relating to an account of the client, and generates a document in response to the request. The document includes a reference to a script configured to display a context menu for the account in the web page. The script receives, asynchronously with the display of the context menu in the web page, a menu object representing actions for the context menu that are valid for the account. The system transmits the document and the script to the client.

11 Claims, 7 Drawing Sheets

ASYNCHRONOUSLY GENERATED MENUS

BACKGROUND INFORMATION

Companies that provide services to customers frequently provide their customers with automated techniques for viewing or managing accounts relating to these services. A service company may, for instance, manage a web site designed to allow its customers to login to the web site and view and/or modify information specific to account(s) maintained with the company.

As an example of such a web site, consider a web portal provided by a telecommunications company for its clients. The telecommunications company may operate a variety of systems and networks, such as legacy systems or networks that were acquired over the years. A particular customer may have a number of different accounts with the company. For example, a customer may be a large corporation with many divisions, each of which may maintain a different account, such as a different long distance or data service account, with the company. Employees in various ones of the divisions may be given different access privileges to the various accounts.

The web portal may provide menus to a customer that include only information or actions that are applicable to the specific account or employee. In one existing web portal, for example, context menus in the web portal, which show actions available to the employee, are generated via script (e.g., JavaScript) that is downloaded with the web page provided by the web portal, where the rules for displaying the context menus are hard-coded into the script. That is, the rules representing valid actions for a particular account are in the user interface downloaded by the customer.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Techniques described herein may provide web pages that describe various accounts of customers. In response to a customer selecting a particular account, a context may be displayed. Actions applicable for a particular context menu may be dynamically and asynchronously retrieved by the web page.

Figure 1:
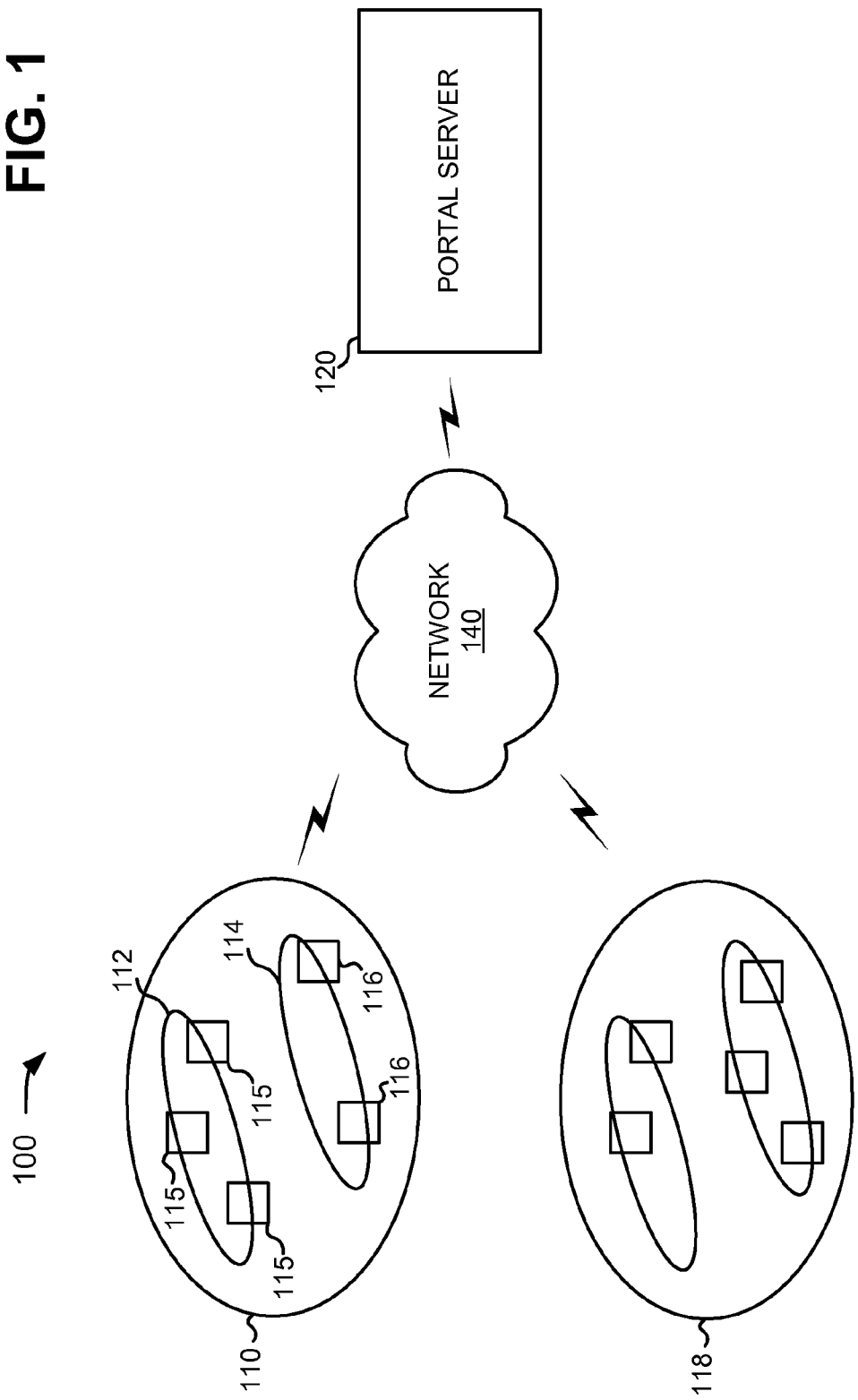
FIG. 1 is a diagram of an exemplary system in which techniques described herein may be implemented.

FIG. 1 depicts an exemplary system 100 in which techniques described herein may be implemented. System 100 may include entities 110 and 118 that connect to a portal server 120 via a network 140. In one implementation, entities 110 and 118 may correspond to customers that wish to access or modify account information provided by portal server 120. The customer may be, for example, a corporation that purchases services from a company associated with portal server 120.

Entities 110 and 118 may include a number of groups or divisions that should each be given different access privileges to portal server 120. For example, entity 110 may be a corporation that includes a number of sections or divisions, such as an accounting section, a customer service section, etc. Various ones of these sections may be associated with different accounts or have different account access privileges associated with the services offered by the company associated with portal server 120. As shown in FIG. 1, for example, entity 110 may include a first division 112 and a second division 114, which may each include client computing devices, such as clients 115 and 116, respectively. Users of clients 115 in division 112 may have different access privileges to the various accounts of entity 110 than users of clients 116 in division 114. As further shown in FIG. 1, entity 118 may include divisions which may include clients.

The number of clients, servers, and entities shown in FIG. 1 are exemplary. In practice, there may be more or fewer clients, servers, or entities.

Network 140 may include a local area network (LAN), a wide area network (WAN), a telephone network, such as the Public Switched Telephone Network (PSTN), an intranet, the Internet, or a combination of networks. Clients 115/116 and portal server 120 may connect to network 140 via wired, wireless, and/or optical connections. Each of clients 115/116 may additionally include a web browser (not shown) for accessing and interacting with web sites. Users of clients 115/116 may, for example, use the web browser to interact with portal server 120.

Clients 115/116 may include a device, such as a personal computer, a wireless telephone, a personal digital assistant (PDA), a laptop, or another type of computation or communication device, a thread or process running on one of these devices, and/or an object executable by one of these devices. Portal server 120 may include computing devices and/or software that provide clients 115/116 with access to accounts provided by an entity associated with portal server 120. For example, if the entity associated with portal server 120 is a telecommunications company, portal server 120 may allow customers of the telecommunications company to view and modify information associated with various accounts that the customer has with the telecommunications company. Portal server 120 may include a front-end web server for interacting with clients 115/116 and various back-end components that implement services used by the customer. Portal server 120 will be described in more detail below.

Figure 2:
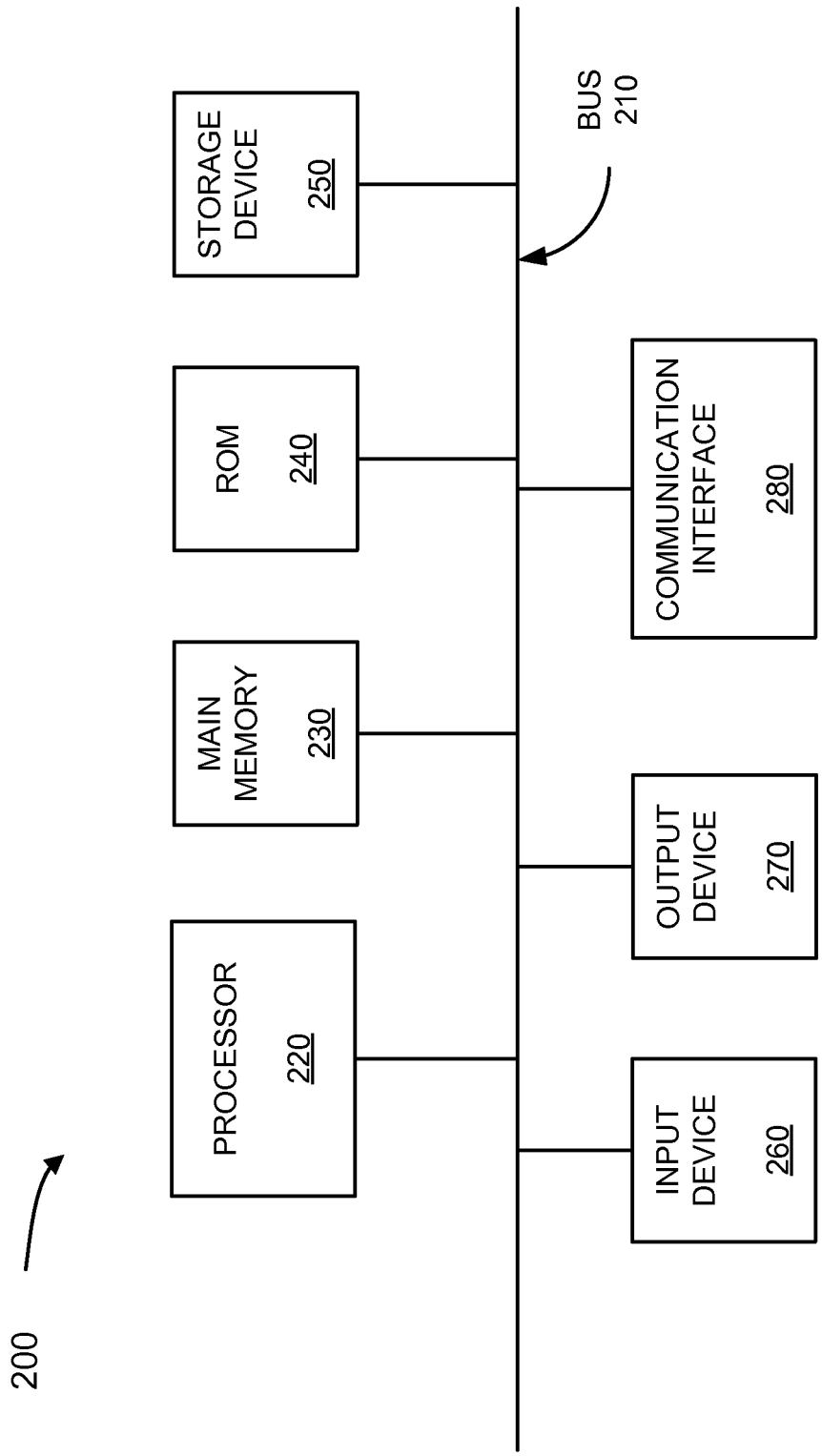
FIG. 2 is an exemplary diagram of a computing device that may correspond to a client or a device included in the portal server shown in FIG. 1.

FIG. 2 is an exemplary diagram of a computing device 200 that may correspond to client 115/116 or a computing device included in portal server 120. Computing device 200 may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into computing device 200, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

Computing device 200 may perform operations in response to processor 220 executing software instructions contained in a computer-readable medium, such as memory 230. A computer-readable medium may be defined as a physical or logical memory device.

The software instructions may be read into memory 230 from another computer-readable medium, such as storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of computing device 200, in other implementations, computing device 200 may contain fewer or additional components. In still other implementations, one or more components of computing device 200 may perform the tasks performed by other components of computing device 200.

Figure 3:
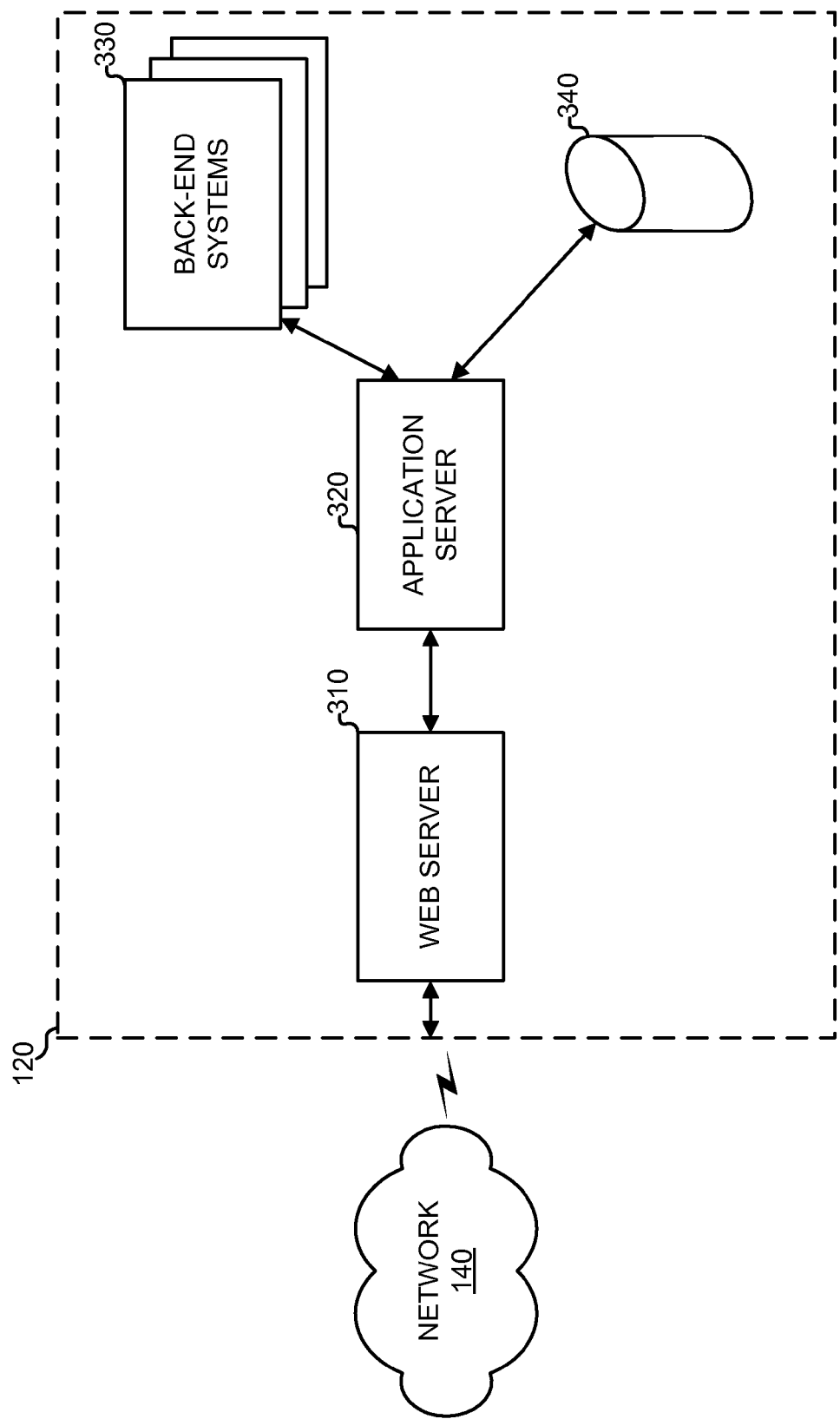
FIG. 3 is a diagram illustrating an exemplary implementation of the portal server shown in FIG. 1.

FIG. 3 is a diagram illustrating an exemplary implementation of portal server 120 in additional detail. Portal server 120 may include a web server 310, an application server 320, back-end systems 330, and a customer profile database 340. In general, web server 310 may interact with clients 115/116 that are connecting to portal server 120 by providing, for example, hyper-text markup language (HTML) documents (i.e., web pages) that contain information requested by the connecting client 115/116.

Web server 310 may include one or more software components and computing devices, such as computing device 200, that implements a web server for clients 115/116. Web server 310 may dynamically generate web pages for each client accessing web server 310. In particular, consistent with aspects described herein, web server 310 may transmit HTML documents and script, such as JavaScript, VBScript, or other computer code, to clients 115/116. The script may include script for generating context menus associated with accounts. In contrast to existing menu generation scripts that may include hard-coded rules that are executed by clients 115/116 to determine which actions are valid for a particular account, the script transmitted by web server 310 may include a menu generation script that determines which actions are valid for a particular account by making asynchronous calls to web server 310, as needed. In response, web server 310 may return an object indicating the available menu actions, which the script may then use to display the actions as a context menu.

Application server 320 may act as a middle layer between web server 310 and between back-end systems 330 and customer profile database 340. Application server 320 may be implemented using one or more computing devices, such as computing devices 200, which may be implemented in a distributed or scaleable manner. Application server 320 may generally operate to, in response to a request from web server 310, retrieve account information from back-end systems 330, query customer profile database 340 to determine valid actions for the account, and return this information to web server 310.

Application server 320 may be an optional component. That is, in some implementations, application server 320 may not be used and web server 310 may additionally perform the functions of application server 320.

Back-end systems 330 may include one or more systems that provide or administer the services that are to be managed via portal server 120. For example, in the context of the telecommunications industry, back-end systems 330 may include router devices, billing systems, order placement systems, repair systems, provisioning systems, engineering systems, or devices for managing such systems. Some of back-end systems 330 may be legacy systems that perform functions similar to newer, non-legacy, versions of the back-end systems.

Customer profile database 340 may include one or more tables to store data that represents available actions for a given customer account. Customer profile database 340 may be implemented as, for example, a relational or non-relational database capable of storing and accessing data. Customer profile database 340 may be implemented on a single computing device or distributed across many computing devices and/or storage devices. In some alternate implementations, customer profile database 340 may be implemented as a simple "flat" file or other similar structure.

Although FIG. 3 shows exemplary components of portal server 120, in other implementations, portal server 120 may contain fewer or additional components. In still other implementations, one or more components of portal server 120 may perform the tasks performed by other components of portal server 120.

Figure 4:
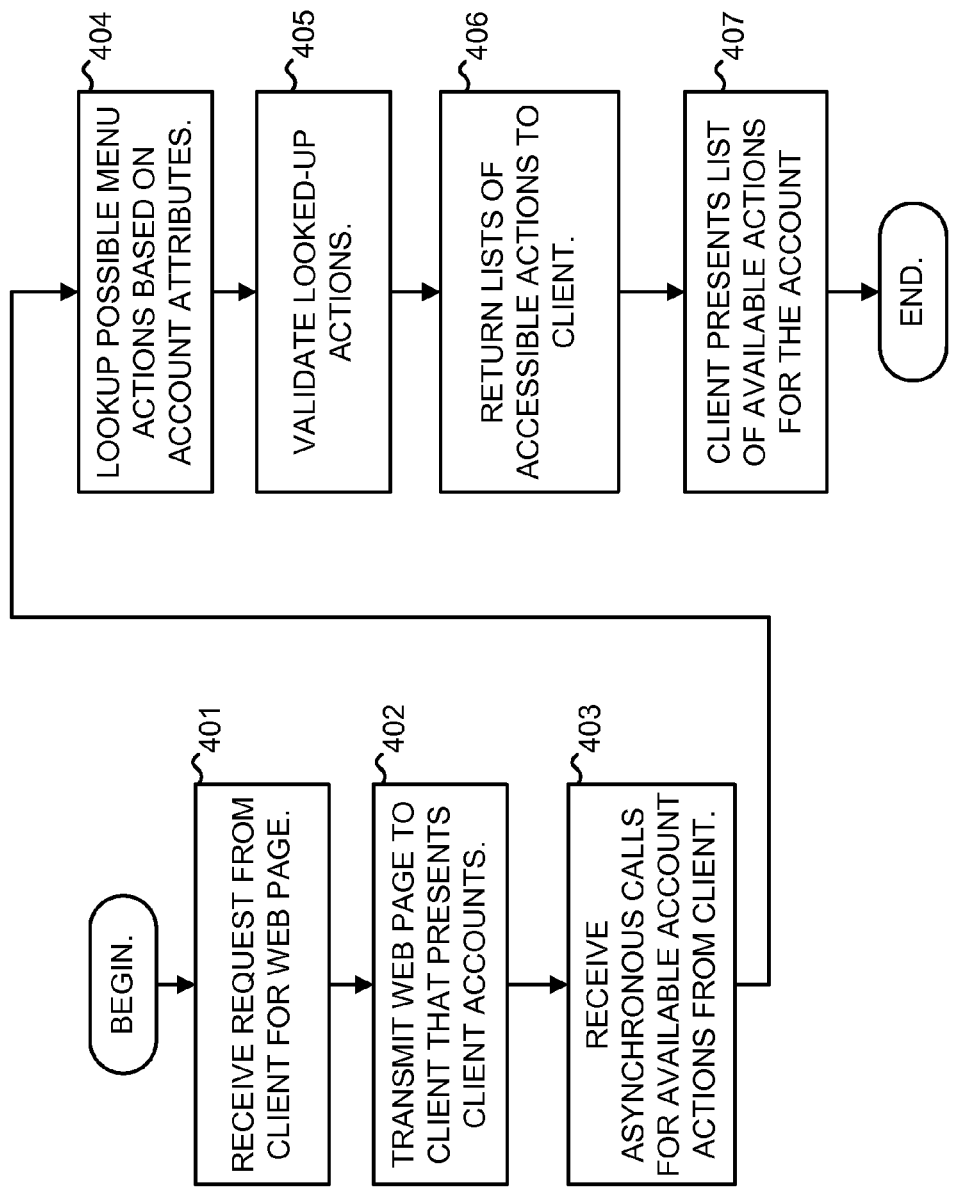
FIG. 4 is a flow chart illustrating exemplary operations performed by the portal server.

The operation of portal server 120 will next be described. FIG. 4 is a flow chart illustrating exemplary operations that may be performed by portal server 120.

To begin, portal server 120 may receive a request from a client 115/116 for a web page (act 401). The request may be received by web server 310. In some implementations, web server 310 may require the client to login or otherwise authenticate a session with web server 310. In this manner, web server 310 may identify the user and may use the user's identity to determine the access permissions or accounts the user should be allowed to view and/or modify.

As discussed previously, the web page requested by client 115/116 may be a web page that provides account information relating to services provided by the entity associated with portal server 120. Contextual menus may be provided in the web page via, for example, a scripting language, such as JavaScript, such that the contextual menus may provide the actions available to client 115/116 when the user selects an account or other item in the web page. For example, the web page may be provided in a tree structure format in which accounts and sub-accounts are displayed as nodes. Each node may represent an account or customer. The set of actions that can be done or performed on a node may be displayed as a context menu when the user selects (e.g., clicks on) the node.

Figure 5:
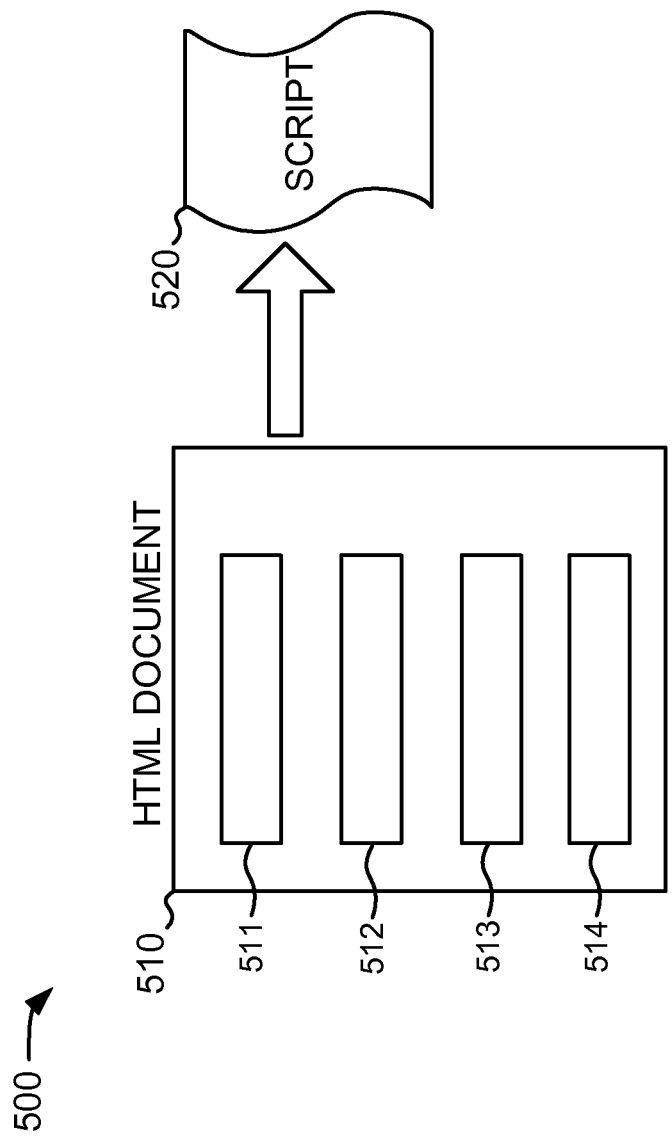
FIG. 5 is a diagram conceptually illustrating an exemplary web page.

FIG. 5 is a diagram conceptually illustrating an exemplary web page 500 generated in response to the request received in act 401. Web page 500 may include an HTML document 510 that is sent to client 115/116 in response to the request from the client. HTML document 510 may include a reference to a script 520. When parsing HTML document 510, client 115/

116 may identify the reference to script 520 and subsequently download script 520. Script 520 may be a menu generation application that can potentially be sent to all clients making requests to web server 310 of portal server 120.

HTML document 510 may additionally include references 511 through 514 to various accounts in which the requesting client 115/116 is interested. For example, each of references 511 through 514 may include an HTML anchor element that includes a description of the account, such as an account number or string. When the user selects or clicks on one of references 511 through 514, script 520 may display a context menu that includes actions available for the particular account. Script 520 may determine which actions are available for a particular account based on a menu object received in response to an asynchronous call back to web server 310 (described in more detail below).

Based on the request made in act 401, web server 310 may generate and transmit a web page, such as web page 500, to client 115/116 that includes a tree structure that presents the accounts available to the client (act 402). Each node of the tree structure may represent a particular account and may be associated with attributes that define the possible menu actions available for the account. These attributes, which are described in more detail below, may be included in the web page for each account displayed in the web page. Client 115/116 may then render web page 500 to display the web page to a user.

Figure 6:
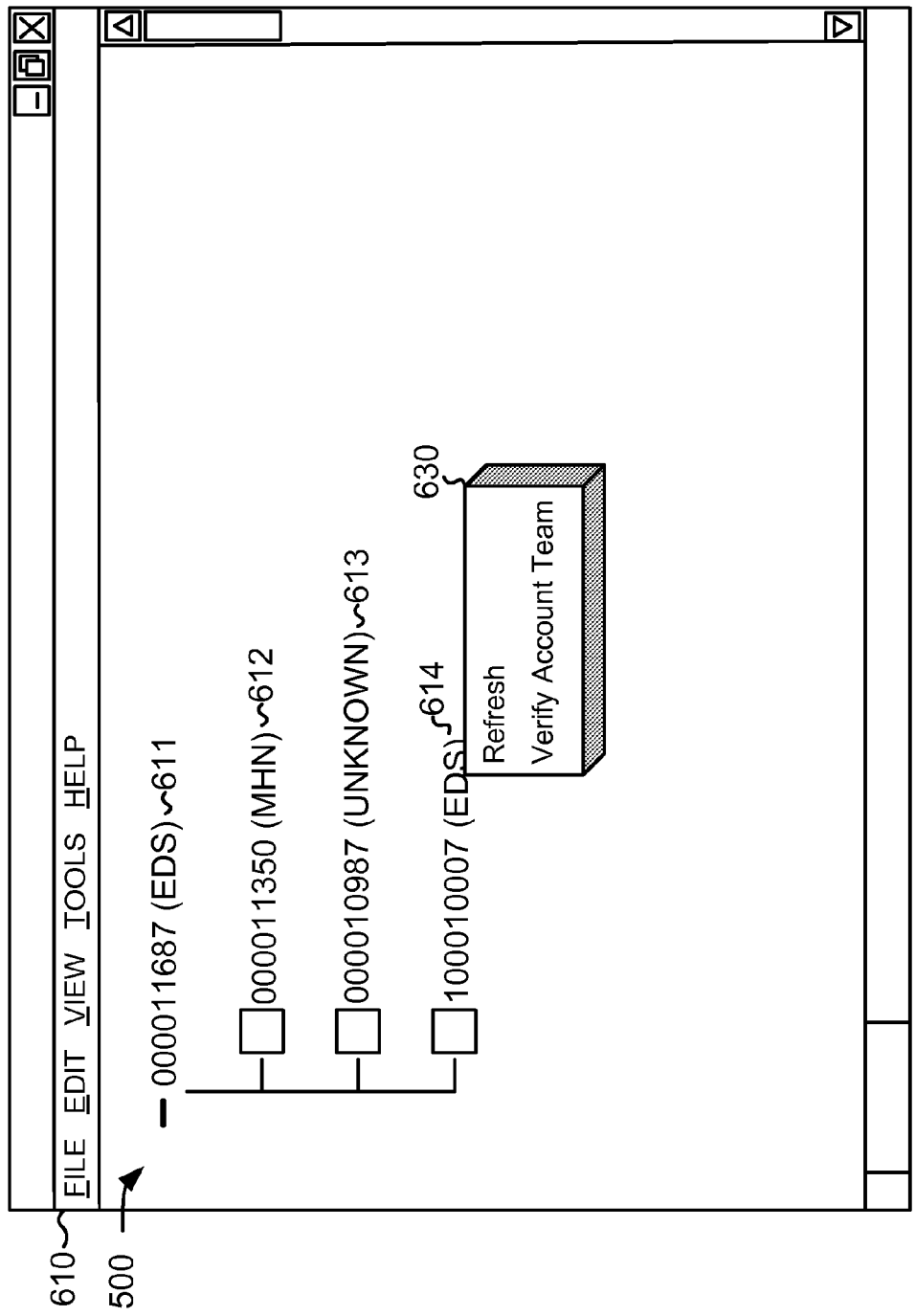
FIG. 6 is a diagram illustrating an exemplary rendered version of the web page shown in FIG. 5.

FIG. 6 is a diagram illustrating an exemplary rendered version of web page 500. More specifically, as shown in FIG. 6, a web browser that includes a browser window 610 may render web page 500. References 611 through 614 in web page 500 may be displayed to the user as different strings that identify different accounts that the user may select. As previously mentioned, in one implementation, the accounts may be displayed in a hierarchical tree fashion in which each account represents a node in the tree. In this example, reference 611 corresponds to a parent account (node) and references 612-614 correspond to child accounts of parent account 611. A context menu, such as context menu 630, may be used to display the actions available for a particular account.

Referring back to FIG. 4, portal server 120 may receive asynchronous calls from script 520 for menu actions that are available for an account (act 403). In one implementation, script 520 may make an asynchronous call in response to a user selecting one of the accounts described by references 611-614. "Asynchronous," as used herein, may refer to script 520 making the calls to web server 310 for a menu object describing the available actions for an account independently of script 520 handling local interactions with the user of client 115/116. In one implementation, script 520 may be implemented using known Asynchronous JavaScript And XML (AJAX) web development techniques, although other technologies could be used.

As an example of an asynchronous call being made by script 520, consider the situation in which a user selects the account corresponding to reference 614. In response, script 520 may initiate a call to web server 310 requesting that web server 310 provide it with the appropriate menu actions available for the account corresponding to reference 614. In some situations, script 520 may have previously obtained the menu actions available for the account corresponding to reference 614. In this situation, script 520 may not need to call web server 310 and may instead simply display an appropriate menu to the user.

Upon receiving the asynchronous calls from client 115/116, web server 310 may transmit the request to application server 320. Application server 320 may lookup the possible menu actions available for the requested account in customer profile database 340 (act 404). Each account may be associated with a number of attributes that can be used to define the possible menu actions available for the account. Values for the attributes may be obtained based on the account, the customer or client, or from back-end systems 330. The attributes for the particular account being requested may be used to reference the valid menu actions in customer profile database 340.

Figure 7:
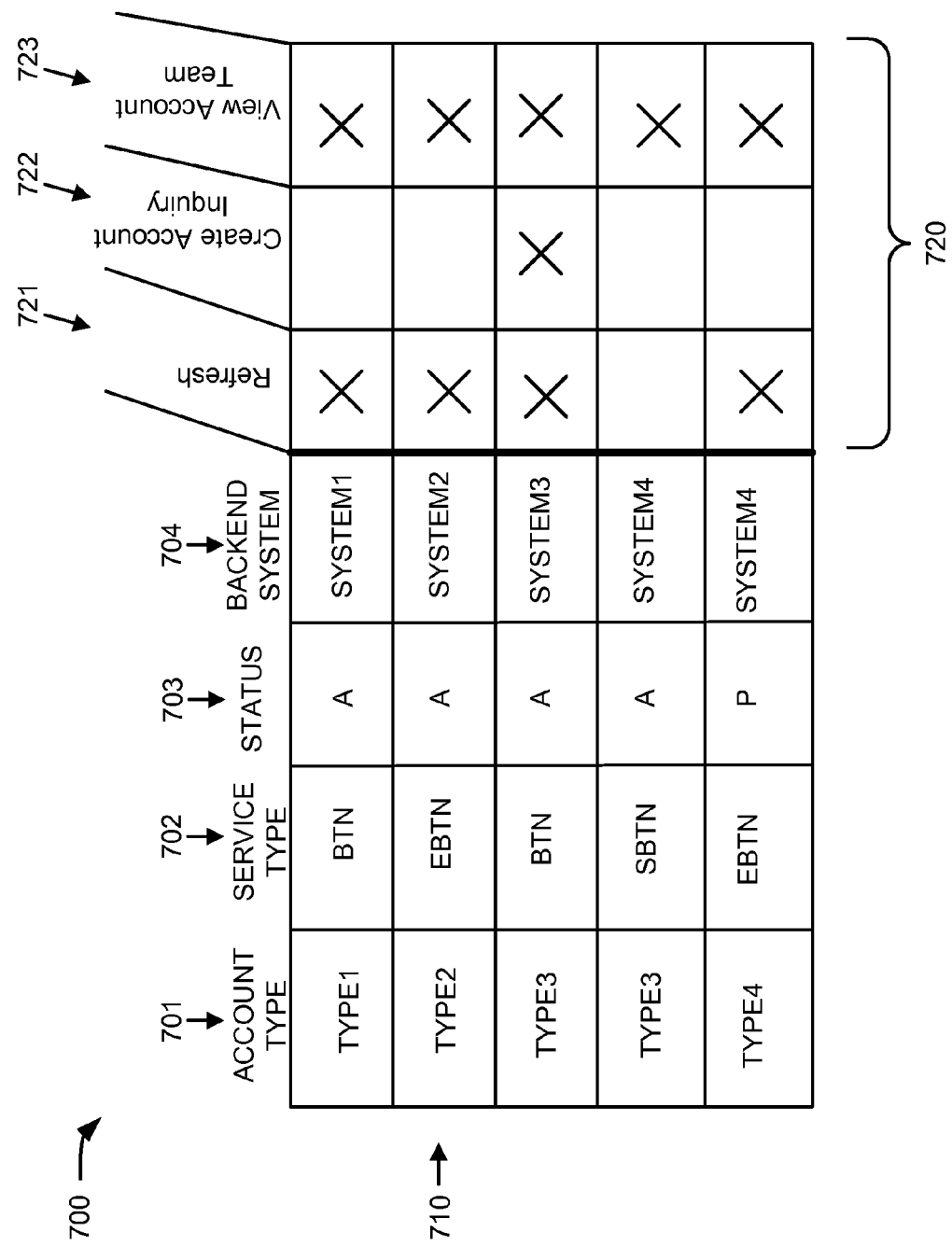
FIG. 7 is a diagram illustrating a portion of an exemplary table in the customer profile database shown in FIG. 3.

FIG. 7 is a diagram illustrating a portion of an exemplary table 700 in customer profile database 340. Table 700 may enumerate which menu actions are valid for each of a number of attributes associated with the account and/or the user accessing the account. In this example, four variables are used to define a set of attributes, and are shown as "account type" variable 701, "service type" variable 702, "status" variable 703, and "backend system" variable 704. Account type variable 701 may relate to the type of account, such as whether it is an account for a single user, a specific group, or some other type of account. Account type variable 701 may be specified as, for example, an arbitrary length string. Service type variable 702 may relate to the type of service provided for an account. An arbitrary number of different enumerations may be possible for the service type, such as, for example, service types "BTN," "SBTN," and "EBTN." Status variable 703 may specify an arbitrary code that indicates the status of the account (e.g., status information "A" or "P"). Back-end system variable 704 may identify one or more of back-end systems 330 that are applicable to this account. In this example, a number of back-end systems are listed (e.g., the back-end systems labeled "SYSTEM1," "SYSTEM2," "SYSTEM3," and "SYSTEM4").

As shown in FIG. 7, each row of table 700 lists a specific combination of variables 701, 702, 703, and 704. Row 710, for example, specifies the account variable combination "TYPE2" (variable 701), "EBTN" (variable 702), "A" (variable 703), and "SYSTEM2" (variable 704).

Table 700 additionally may include an account menu action section 720. Account menu action section 720 may include menu actions that are available for the particular combination of variables 701-704. In this example, three menu actions are shown: "refresh" action 721, "create account inquiry" action 722, and "view account team" action 723. Refresh action 721 may be an action that allows a user to refresh an account view, create account inquiry action 722 may be an action that allows a user to generate an account inquiry, and view account team action 723 may be an action that allows a user to view people assigned to an account. For the variable values shown in row 710, "refresh" action 721 and "view account team" action 723 are available, while "create account query" action 722 is not available.

Although, for illustrative simplicity, four exemplary variables 701-704 and three possible menu actions 721-723 are shown in FIG. 7, it can be appreciated that in practice there may be a number of additional possible menu actions.

Returning to FIG. 4, the possible actions looked-up in customer profile database 340 by application server 320 may be represented as an object, called a menu object herein, that represents the valid menu actions for a particular account. Application server 320 may validate the looked-up actions (act 405). For example, application server 320 may perform a check to ensure that the user requesting the menu object has permission to perform the actions. In some implementations, application server 320 may validate the looked-up actions by querying back-end systems 330.

Application server 320 may forward the validated menu object to web server 310, which may return the menu object to the requesting client 15/116 (act 406). The returned menu object may represent the menu actions that are valid for the particular account. Script 520 at client 115/116 may then display the list of available actions to the user (act 407). In response to the user selecting the account, such as by the user selecting or clicking one of the accounts corresponding to references 611-614 (FIG. 6), script 520 may display a context menu for the particular account that includes the valid menu actions returned in the object.

Referring to web page 500 (FIG. 6), for example, assume that the user wishes to perform an action relating to the account corresponding to reference 614 (account "100010007"). The user may select or click on the text or on the check box associated with the account corresponding to reference 614. In response, script 520 may call web server 310 to get the menu object for this account and, based on the menu object, generate context menu 630 that displays the actions applicable for this account. In this example, assume that the returned menu object indicated that two actions are enabled for this account: "Refresh" and "Verify Account Team." Script 520 may display these actions in context menu 630.

Systems and methods described herein may enable web pages including context sensitive menus to be provided to end-users without embedding hard-coded software rules that determine which menu actions to display for a particular account. Instead, the rules may be defined in a database and may be dynamically and asynchronously accessed and represented as a menu object that may be requested as it is needed by the client. Errors and maintenance difficulties encountered with manually maintaining menu generation rules in code in the user interface can be reduced while providing for the efficient and dynamic generation of possible menu actions at the server. For example, changes to the menu generation rules in the customer profile database can be easily implemented. Because of this, new accounts or valid actions for an account can be easily maintained and added simply by modifying the customer profile database.

The foregoing description provides illustration and description, but is not intended to be exhaustive or to limit the embodiments to the precise form disclosed. Modifications and variations are possible in light of the above teachings or may be acquired from practice of the invention.

For example, while a series of acts has been described with regard to the flowchart of FIG. 4, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments consistent with principles of the invention is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, via a server device, a request for a web page from a client,
the web page relating to an account of the client, and
the request including one or more attributes of the account or the client;
generating, via a server device, a document in response to the request,
the document including a reference to a script to:
display a context menu for the account in the web page, and
receive, asynchronously with display of the context menu in the web page,
a menu object representing actions for the context menu that are valid for the account,
where the menu object is dynamically generated based on the one or more attributes, and
generating the document including:
including the one or more attributes in the document; and
transmitting, via a server device, the document and the script to the client.

2. The method of claim 1, further comprising:
receiving a request, from the script, for the actions for the account, the request being made by the script in response to a user selection of the account.

3. The method of claim 1, where dynamically generating the menu object includes looking up the one or more attributes associated with the account or the client in a database that relates sets of account attributes to valid menu actions,
where the actions include one or more of the valid menu actions for one or more of the sets of account attributes that correspond to the one or more attributes associated with the account or the client.

4. The method of claim 3, further comprising:
validating the menu object to confirm that the client has permission to perform the actions represented by the menu object.

5. The method of claim 1, where the web page relates to a plurality of accounts associated with the client, each of the plurality of accounts being associated with a respective one of a plurality of context menus.

6. The method of claim 1, further comprising:
maintaining a customer profile database that includes customer profiles that describe available actions for different combinations of attributes describing the client or an account associated with the client.

7. The method of claim 1, where the script uses Asynchronous JavaScript And XML (AJAX).

8. A device comprising:
a processor to:
receive a request for a web page from a client relating to an account of the client,
the request including one or more attributes of the account or the client;
generate a document in response to the request,
the document including a reference to a script to:
display a context menu for the account in the web page, and
receive, asynchronously with the display of the context menu in the web page,
a menu object representing actions for the context menu that are valid for the account, where the menu object is dynamically generated based on the one or more attributes of the account, and where, when generating the document, the processor is to:
include the one or more attributes in the document; and transmit the document and the script to the client, where dynamically generating the menu object includes looking up the one or more attributes in a database.

9. The device of claim 8, where the database relates sets of account attributes to valid menu actions, and where the actions include one or more of the valid menu actions for one or more of the sets of account attributes that correspond to the one or more attributes associated with the account or the client.

10. The device of claim 9, where the processor is further to:
validate that the client has permission to perform the actions represented by the menu object.

11. The device of claim 9, where the processor is further to:
access a customer profile database that includes customer profiles that describe available actions for different combinations of attributes describing the client or an account associated with the client.

\* \* \* \* \*